United States Patent [19]

Hirade et al.

[11] 4,397,036

[45] Aug. 2, 1983

[54] DIVERSITY SYSTEM

[75] Inventors: Kenkichi Hirade, Yokosuka; Takeshi Hattori; Fumiyuki Adachi, both of Yokohama, all of Japan

[73] Assignee: Nippon Telegraph and Telephone Public Corporation, Tokyo, Japan

[21] Appl. No.: 35,538

[22] Filed: May 3, 1979

[30] Foreign Application Priority Data

May 10, 1978 [JP] Japan ................................. 53-54408
Sep. 20, 1978 [JP] Japan ................................ 53-114541

[51] Int. Cl.³ .............................................. H04B 7/06
[52] U.S. Cl. .................................... 455/137; 455/141; 357/40
[58] Field of Search .................... 455/39, 273, 42, 52, 455/57, 101, 103, 105, 132, 137, 138, 139, 140, 141; 325/45, 47, 56, 58, 61, 154, 156, 157, 158, 301, 305, 306, 307; 375/15, 39, 40, 54, 44

[56] References Cited

U.S. PATENT DOCUMENTS 3,339,199 8/1967 Pichafroy ............................. 325/305

OTHER PUBLICATIONS

A Periodic Switching Diversity Technique for a Digital FM Land Mobil Radio, By F. Adachi, et al., IEEE Transactions on Vehiclar Technology, vol. VT 27, No. 4, Nov. 1978, pp. 211–219.

*Primary Examiner*—Tommy P. Chin
*Attorney, Agent, or Firm*—Armstrong, Nikaido, Marmelstein & Kubovcik

[57] ABSTRACT

A diversity system utilizing a plurality of branches has been found for an angle modulated digital signal transmission. The received signal on each branch is modulated with a local signal which has the same period as the digital signal, and satisfies the orthogonal relationship with each other. The modulated signals are combined by simply summing them, and the combined signal is differentially detected. In the case of two branches, said orthogonal local signals are $\sqrt{2/T} \cdot \sin(2\pi/T)t$, and $\sqrt{2/T} \cdot \cos(2\pi/T)t$, where T is the bit duration of the digital signal, and said local modulation is the amplitude modulation. The present invention can provide the same diversity effect as the prior maximal ratio combining system, although the present invention does not utilize a complicated cophasing means between each branches.

12 Claims, 11 Drawing Figures

DIVERSITY SYSTEM

BACKGROUND OF THE INVENTION

The present invention relates to a diversity system, in particular, relates to a diversity system for an angle modulated digital signal transmission for reducing the effect of multipath fading. There is not often obtained a line-of-sight propagation path in a mobile communication system in a large city due to buildings and other obstacles, thus, the received signal is the sum of many signals reflected by buildings and other obstacles. Accordingly, severe fading occurs frequently with vehicle movement. The severe fading causes deterioration of the average received signal-to-noise ratio (SNR) and thus degradation of the error rate performance. If we try to assure sufficient error rate performance in the fading environment, extravagant transmitting power is necessary.

It has been well known that diversity techniques are useful to reduce the effect of the fading. There have been known many diversity systems, some of which are a space diversity, a frequency diversity, a route diversity, a time diversity, an angle diversity, and a sight diversity. The present invention relates in particular to a space diversity, which can be sometimes modified to an angle diversity and/or a sight diversity. A space diversity utilizes in principle at least two separated antennas either at the transmission side or at the reception side, and the received signals on separated antennas are combined. The field of the present invention is further limited to a digital transmission system utilizing angle modulation including both phase-shift-keying (PSK) and frequency-shift-keying (FSK), that is to say, the present invention can not be utilized for an analog signal transmission such as voice. In order to demodulate the angle modulated signal, the present invention utilizes a differential coherent detection system. Accordingly, the field of the present invention is summarized as (1) A space diversity,
(2) Angle modulation for a digital signal, and
(3) A differential coherent detection system.

Concerning a space diversity, there have been known at least three combining methods, which are (1) selection combining, (2) equal gain combining, and (3) maximal ratio combining.

In a selection combining, received signal envelope on each antenna is compared with one another, and the antenna which provides the highest envelope level is selected through a switch.

In an equal gain combining, received signals are simply combined after the received signal phases are controlled to be in phase.

Figure 1:
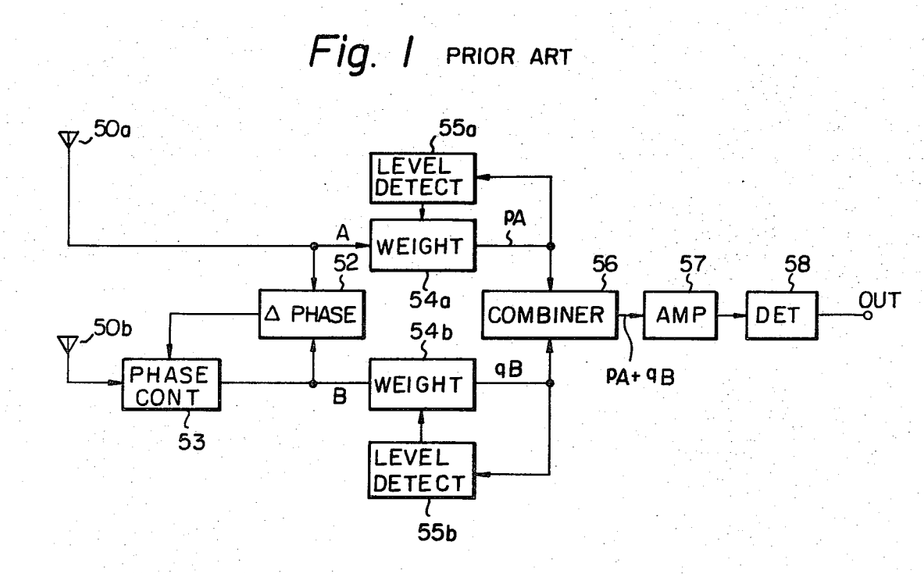
FIG. 1 is the block diagram of a prior diversity reception system.

In a maximal ratio combining, the received signal on all antennas are combined after the received signals are co-phased and weighted so that the SNR of the combined signal becomes maximum. The maximal ratio combining is the best one of the prior three space diversity techniques. FIG. 1 shows the block diagram of the prior maximal ratio combining. In FIG. 1, the receiver has two separated antennas 50a and 50b. The phase difference of the signals received on those antennas is detected by the phase detector 52, which in turn controls the phase shifter 53 so that the phase difference between two signals becomes zero. The pair of in-phase signals (A) and (B) are applied to the combiner 56 through the respective weight circuits 54a and 54b, which are controlled by the envelope detectors 55a and 55b, respectively, so that the SNR of the combined signal becomes maximum. Thus, the outputs of the weight circuits 54a and 54b are pA and qB, where $0 < p \leq 1$, and $0 < q \leq 1$. Those weighted signals pA and qB are combined by the combiner 56, the output of which is therefore pA+qB. The output of the combiner 56 is applied to the detector 58 through the amplifier 57, and the detector 58 provides the demodulated output signal as a base-band signal.

However, the prior space diversity systems mentioned above have the disadvantages that the structure of the apparatus is complicated. That is to say, a circuit for envelope detecting of all received signals is necessary in the selection combining and the maximal ratio combining, a circuit for detecting the phase difference is necessary in the equal gain combining and the maximal rato combining, a phase control circuit for providing the co-phased signals is necessary in the equal gain combining and the maximal ratio combining. Further, the selection combining necessitates means for detecting the envelope levels in all the branches and selecting the branch having the highest envelope level. Further, the maximal ratio combining requires means for weighting according to the each received signal envelope as mentioned in accordance with FIG. 1.

The complicated structure of the apparatus causes the operational unstability of the receiver and also increases in the price of the apparatus.

SUMMARY OF THE INVENTION

It is an object, therefore, of the present invention to overcome the disadvantages and limitations of prior diversity systems by providing a new and improved diversity system.

It is also an object of the present invention to provide a diversity system in which the structure of the apparatus is simple and the same diversity effect as the prior maximal ratio combining system is achieved.

The above and other objects are attained by a diversity system for an angle modulated digital signal transmission, utilizing a plurality of branches to be combined, comprising modulation means for modulating the received signal with a local signal, said means being provided for each branch, combining means for combining all the locally modulated signals, a differential detector the input of which is connected to the output of said combining means, an integrate-and-dump filter connected to the output of said differential detector, and said local signal having the same period as the digital signal, and satisfying the orthogonal relationship between the local signals.

Some of the important features of the present invention are listed below.

(1) The signal is an angle modulated digital signal.
(2) Each received signal in each branch is modulated with a local signal, which has the same period as the digital signal, and satisfies the orthogonal relationship between the local signals.
(3) The locally modulated signals are combined before they are detected.
(4) A differential detector is utilized.
(5) An integrate-and-dump filter is connected to the output of the differential detector.

BRIEF DESCRIPTION OF THE DRAWINGS

The foregoing and other objects, features, and attendant advantages of the present invention will be appreciated by means of the following description and drawings wherein.

DESCRIPTION OF THE PREFERRED EMBODIMENTS

Figure 2:
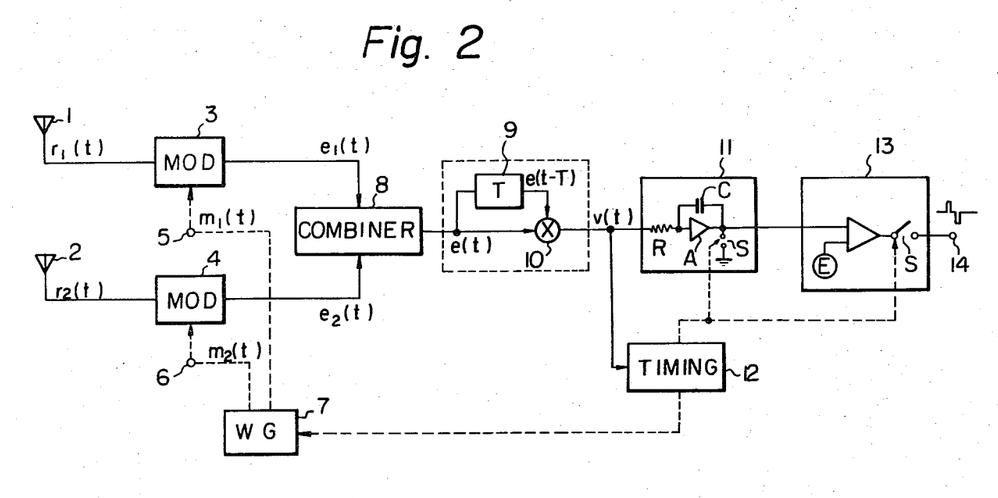
FIG. 2 is the block diagram of the embodiment of the diversity receiver according to the present invention.

FIG. 2 shows a block-diagram of the embodiment of the diversity system according to the present invention. In the figure, 1 and 2 are antennas, 3 and 4 are amplitude modulators, 7 is a local signal generator, 8 is a combiner, 9 is a delay line, 10 is a product demodulator, 11 is an integrate-and-dump filter or a low pass filter, 12 is a timing recovery circuit, 13 is a decision circuit, and 14 is an output terminal of a baseband signal.

Referring to FIG. 2, the two signals received by the antennas 1 and 2 are amplitude-modulated by the two specific signals 5 and 6 generated by the generator 7, and then the pair of locally modulated signals are combined by the combiner 8. The output of the combiner is demodulated by the differential-detector composed of the delay line 9 and the product demodulator 10. It is supposed that the delay time T of the delay line 9 is the same as the bit duration of the digital signal. When the differential detector output is fed into the integrate-and-dump filter or low-pass filter 11, it is assigned as "0" or "1" and then regenerated by the decision circuit 13. Of course the "0" and "1" relate to "space" and "mark" of a digital signal, respectively. The output of the decision circuit 13 is applied to the output terminal 14.

In the above-mentioned description, the two specific signals 5 and 6 have the same period as the digital signal, and satisfy the mutually-orthogonal relationship. Such signals can be generated by the waveform generator 7, which is, for instance, a function generator. When the low pass filter 11 is utilized instead of an integrated-and-dump filter, the cutoff frequency of the low pass filter is designed to be the repetition frequency of the baseband digital signal. The timing circuit 12 regenerates the timing information from the demodulated baseband signal derived from the output of the differential detector, and said timing circuit 12 controls the integrate-and-dump filter 11 and the decision circuit 13.

Hereafter, we explain the theoretical background of the present invention, and show that the diversity improvement effect of the present invention is equal to that of the maximal ratio combining system.

Letting $r_1(t)$ and $r_2(t)$ be the respective signals received by the two antennas via a multipath radio channel, which is assumed to be characterized by the well-known Rayleigh fading channel, they can be represented as $$r_1(t) = Re\{Z_1 \exp j[\omega_c t + \psi_m(t)]\} \quad (1)$$

$$r_2(t) = Re\{Z_2 \exp j[\omega_c t + \psi_m(t)]\}$$

$Re\ Z_n \exp j[\omega_c t + \psi_m(t)]$ denotes the real part of $Z_n \exp j[\omega_c t + \psi_m(t)]$ and $\omega_c$ and $\psi_m(t)$ are carrier center frequency and digital angle modulation phase, respectively. Furthermore, $Z_1$ and $Z_2$ are complex Gaussian random variables represented as $$\begin{cases} Z_1 = R_1 e^{j\theta_1} \\ Z_2 = R_2 e^{j\theta_2} \end{cases} \quad (2)$$

where $R_1$ and $R_2$ are Rayleigh distributed envelopes and $\theta_1$ and $\theta_2$ are uniformly distributed phases.

Being amplitude-modulated by the specific waveforms $m_1(t)$ and $m_2(t)$ that satisfy the specific relationship to be defined later, $r_1(t)$ and $r_2(t)$ are transformed into the following forms;

$$\begin{aligned} e_1(t) &= R_e\{Z_1 m_1(t) \exp \cdot j[\omega_c t + \psi_m(t)]\} \\ e_2(t) &= R_e\{Z_2 m_2(t) \exp \cdot j[\omega_c t + \psi_m(t)]\} \end{aligned} \quad (3)$$

Then, the combiner output e(t) becomes;

$$e(t) = e_1(t) + e_2(t) = R_2\{Z(t) \exp j[\omega_c t + \psi_m(t)], 56 \quad (4)$$

where Z(t) is given by $$Z(t) = Z_1 m_1(t) + Z_2 m_2(t) \quad (5)$$

The e(t) is fed into the differential detector. The low-pass component of the product demodulator output, v(t), is given by $$v(t) = \tfrac{1}{2} Re\ Z^*(t) Z(t-T) \exp\{-j[\omega_c T + \psi_m(t) - \psi_m(t-T)]\} \quad (6)$$

where $Z^*(t)$ is the complex conjugate of Z(t) and T is the time delay of the delay line, which is usually set equal to the bit duration of the digital signal.

For example, letting the digital angle modulated signal be a binary differential phase-shift-keyed (BDPSK) signal, $\omega_c T$ and $\psi_m(t)$ are given by:

$$\omega_c T = 2\nu\pi \quad (\nu = 1,2,3,\ldots) \quad (7)$$

$$\psi_m(t) - \psi_m(t-T) = \begin{cases} 0 & \text{for mark transmission} \\ \pi & \text{for space transmission} \end{cases}$$

Therefore, v(t) becomes for $t \in [nT, (n+1)T]$ $$v(t) = \tfrac{1}{2} R_e\{Z^*(t) Z(t-T) e^{-j(o/\pi)}\} = \pm \tfrac{1}{2} R_e\{Z^*(t) Z(t-T)\} \quad (8)$$

where (+) and (−) denotes mark and space transmissions, respectively. Integration of equation (8) from $t = nT$ to $t = (n+1)T$ yields the following integrate-and-dump filter (or low-pass filter) output;

$$\int_{nT}^{(n+1)T} V(t)dt = \pm \tfrac{1}{2} Re \int_{nT}^{(n+1)T} \{Z^*(t)Z(t-T)\}dt \quad (9)$$

Substituting Eq. (5) into the above equation, we find $$\int_{nT}^{(n+1)T} V(t)dt = \pm \tfrac{1}{2} |Z_1|^2 \int_{nT}^{(n+1)T} m_1(t)m_1(t-T)dt \quad (10)$$

$$\pm \tfrac{1}{2} |Z_2|^2 \int_{nT}^{(n+1)T} m_2(t)m_2(t-T)dt$$

$$\pm \tfrac{1}{2} Re\{Z_1^*Z_2\} \int_{nT}^{(n+1)T} m_1(t)m_2(t-T)dt$$

$$\pm \tfrac{1}{2} Re\{Z_1Z_2^*\} \int_{nT}^{(n+1)T} m_1(t-T)m_2(t)dt$$

If $m_1(t)$ and $m_2(t)$ are selected so that they satisfy the following specific relationship;

$$m_1(t) = m_1(t-T) \quad (11)$$

$$m_2(t) = m_2(t-T)$$

and $$\begin{cases} \int_{nT}^{(n+1)T} m_1(t)m_1(t-T)dt = \int_{nT}^{(n+1)T} m_2(t)m_2(t-T)dt = 1 \\ \int_{nT}^{(n+1)T} m_1(t)m_2(t-T)dt = \int_{nT}^{(n+1)T} m_1(t-T)m_2(t)dt = 0, \end{cases} \quad (12)$$

equation (10) becomes $$\int_{nT}^{(n+1)T} V(t)dt = \pm \tfrac{1}{2} (R_1^2 + R_2^2). \quad (13)$$

The equation (13) shows the output of the detected value of the present diversity reception system, and it should be appreciated that the result shown by the equation (13) coincides with the output of the differential-detector followed by the integrate-and-dump filter when the maximal ratio combining scheme in FIG. 1 is adopted.

It should be noted that the conditions for the modulation signals dictated by the equations (11) and (12) require that the local signals $m_1(t)$ and $m_2(t)$ must have the same period as the digital signal, and each of the local signals must satisfy the mutual orthogonal relationship.

For an example, satisfying equations (11) and (12), we find $$m_1(t) = \sqrt{2/T} \cos(2\pi/T)t \quad (14)$$

and $$m_2(t) = \sqrt{2/T} \sin(2\pi/T)t$$

Hitherto, we have dealt with diversity reception having two antenna branches. We may readily extend the above descriptions to diversity reception with more than two branches. In that case, we have the following equation instead of the equation (14);

$$m_p(t) = \sqrt{2/T} \left\{ \begin{matrix} \cos \\ \sin \end{matrix} \right. (p\, 2\pi t/T) \quad p = 1,2,3, \ldots$$

For instance, when there are four branches, each of the modulation signals are:

$$m_1(t) = \sqrt{2/T} \sin(2\pi/T)t, \quad (15)$$

$$m_2(t) = \sqrt{2/T} \cos(2\pi/T)t,$$

$$m_3(t) = \sqrt{2/T} \sin(4\pi/T)t,$$

and $$m_4(t) = \sqrt{2/T} \cos(4\pi/T)t$$

Therefore, $m_p(t)$ satisfies the orthogonal relationship given by $$m_p(t) = m_p(t-T) \quad (16)$$

$$\int_{nT}^{(n+1)T} m_p(t) m_q(t-T)dt = \delta_{pq}$$

where $\delta_{pq}$ denotes the Kronecker's delta function defined by $$\delta_{pq} = \begin{cases} 1 \text{ for } p = q \\ 0 \text{ for } p \neq q \end{cases} \quad (17)$$

Figure 3:
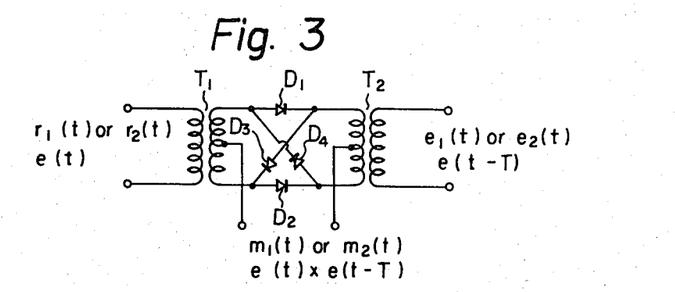
FIG. 3 is the embodiment of the modulator and/or the product demodulator in FIG. 2, FIG. 4(A) and FIG. 4(B) show two embodiments of the combiner in FIG. 2, FIG. 5(A) and FIG. 5(B) show two embodiments of the orthogonal signal generator in FIG. 2.

The amplitude modulators 3 and 4, and the product demodulator 10 can be implemented by a conventional ring modulator shown in FIG. 3, in which a pair of transformers $T_1$ and $T_2$ and four diodes $D_1$–$D_4$ are utilized. When a ring modulator is utilized as amplitude modulators 3 or 4, the input signal $r_1(t)$ or $r_2(2)$ is applied to the transformer $T_1$, and the special local signal $m_1(t)$ or $m_2(2)$ is applied to the center taps of the secondary windings of two transformers, then the modulated output signal $e_1(t)$ or $e_2(t)$ is obtained at the first winding of the second transformer $T_2$. On the other hand, when the ring modulator is utilized as the product demodulator 10, a pair of input signals $e(t)$ and $e(t-T)$ are applied to the first windings of the transformers $T_1$ and $T_2$, and then the product $e(t) \times e(t-T)$ is obtained at the center taps of the secondary windings of the two transformers.

Figure 4A:
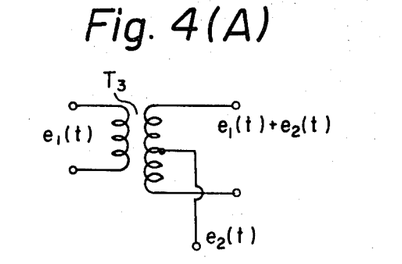

FIG. 4(A) shows the embodiment of the combiner 8, in which the transformer T, has a first winding and a center-tapped secondary winding. A pair of input signals $e_1(t)$ and $e_2(t)$ are applied to the first winding and the center tap of the second winding, respectively, and the combined output signal $e_1(t)+e_2(t)$ is obtained at the secondary winding of the transformer.

Figure 4B:
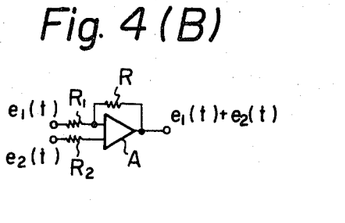

FIG. 4(B) is the other embodiment of the combiner 8, in which a pair of input signals $e_1(t)$ and $e_2(t)$ are fed to an operational amplifier A with feedback resistor R and the input resistor $R_1$ and $R_2$ respectively, and the combined output signal $e_1(t)+e_2(t)$ is obtained at the output of the operational amplifier A.

Figure 5A:
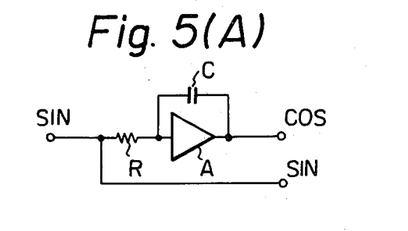
Figure 5B:
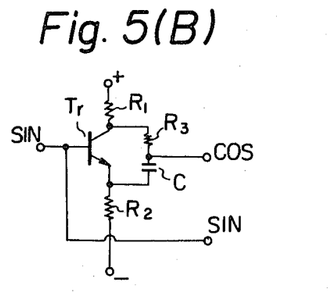

The waveform generator 7 can be implemented, for instance, by the circuit of either FIG. 5(A) or FIG. 5(B). FIG. 5(A) is an integration circuit having an operational amplifier A, a feedback capacitor C, and an input resistor R, and when an input signal sin (x) is applied as $m_1(t)$, the output signal cos (x) is obtained as $m_2(t)$. The function of FIG. 5(A) can be also realized by the circuit in FIG. 5(B) having a transistor $T_r$, the resistor $R_1$-$R_3$, and the capacitor C.

Figure 5C:
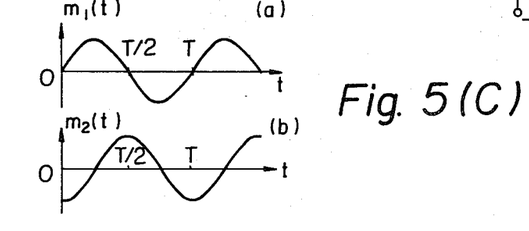
FIG. 5(C) shows the orthogonal signal waveforms generated by the circuit of FIG. 5(A) or FIG. 5(B)

FIG. 5(C) shows the waveforms of the signals $m_1(t)$ and $m_2(t)$, in which $m_1(t)=\sqrt{2/T} \sin 2\pi t/T$, and $m_2(t)=-\sqrt{2/T} \cos 2\pi t/T$.

The decision circuit 13 can be implemented by an operational amplifier, one input of which is reference voltage (E), and the output of the decision circuit 13 is switched according to the control by the timing circuit 12. Then, the decision circuit 13 provides a mark signal or a space signal depending upon whether the input voltage is higher than the threshold voltage (E) or not.

Figures 6, 8:
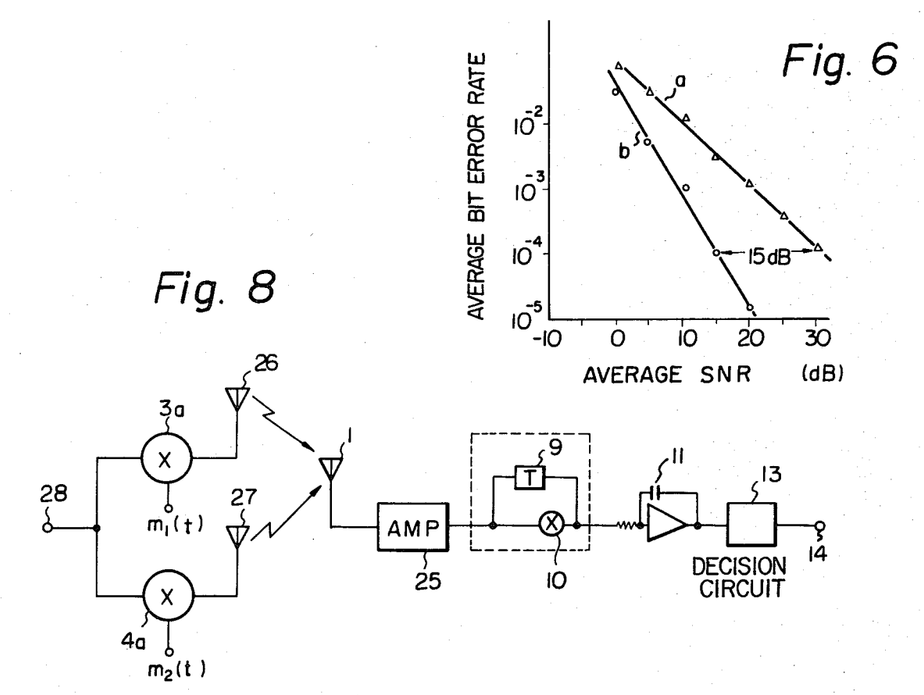
FIG. 6 shows the simulation test results of the apparatus shown in FIG. 2.
FIG. 8 is the block diagram of the another embodiment of the diversity system according to the present invention.

FIG. 6 shows the simulation test results of the present diversity system, in which the abscissa is the average value of the received SNR and the ordinate is the average bit error rate. In FIG. 6, the curve (a) shows the performance without diversity, and the curve (b) shows the performance with diversity. It should be noted in FIG. 6 that the required average SNR can be reduced by 15 dB by the use of the present diversity system for the error rate of $10^{-4}$. Further, it should be appreciated that according to the experiment of results the waveforms $m_1(t)$ and $m_2(t)$ do not need to be synchronized with the received signal for obtaining the above error rate, that is to say, the waveform generator 7 does not need to be controlled by the timing circuit 12.

Now, some modifications of the present invention will be described.

First, we explained that the modulators 3 and 4 in FIG. 2 perform amplitude modulation. However, phase modulation intead of amplitude modulation is possible in said modulators. In the case of phase modulation, the waveforms $m_1(t)$ and $m_2(t)$ in the previous explanation should be replaced by $\psi_1(t)$ and $\psi_2(t)$, respectively, and those two waveforms must satisfy the following equations:

$$\begin{cases} \psi_1(t) = \psi_1(t-T) \\ \psi_2(t) = \psi_2(t-T) \end{cases} \quad (18)$$

$$\int_{nT}^{(n+1)T} \exp\{-j[\psi_1(t) - \psi_2(t-T)]\}dt = 0 \quad (19)$$

$$\int_{nT}^{(n+1)T} \exp\{-j[\psi_2(t) - \psi_1(t-T)]\}dt = 0$$

where n is an integer, and T is the bit duration of the digital signal.

Since $\psi_1(t)$ and $\psi_2(t)$ are periodic functions of T, from the equation (18), the equation (19) is changed as follows.

$$\int_{nT}^{(n+1)T} \exp(\pm j[\psi_1(t) - \psi_2(t)])dt = 0 \quad (20)$$

One of the solutions of the equation (20) is given below.

$$\psi_1(t) - \psi_2(t) = \beta \cos \omega_0 t$$

where $\beta$ and $\omega_0$ satisfy the following relationship.

$$\omega_0 T = 2l\pi \quad (21)$$

$$J_0(\beta) = 0 \quad (22)$$

where $l$ is a positive integer, and $J_0(x)$ is the first kind Bessel function of the Zero'th order.

When the diversity system has more than two branches, the equators (18) and (19) are generalized as follows.

$$\psi_i(t) = \psi_i(t-T) \ldots (i = 1,2,3, \ldots m) \quad (23)$$

$$\int_{nT}^{(n+1)T} \exp\{-j[\psi_i(t) - \psi_j(t)]\}dt = 0 \ldots (i \neq j, \quad (24)$$

$$i,j = 1,2,3, \ldots ,m)$$

It should be appreciated that the modulation signals given by the equations (18)–(24) also have the same repetition period T as the digital signal, and the said modulation signals satisfy the orthogonal relationship.

Figure 7:
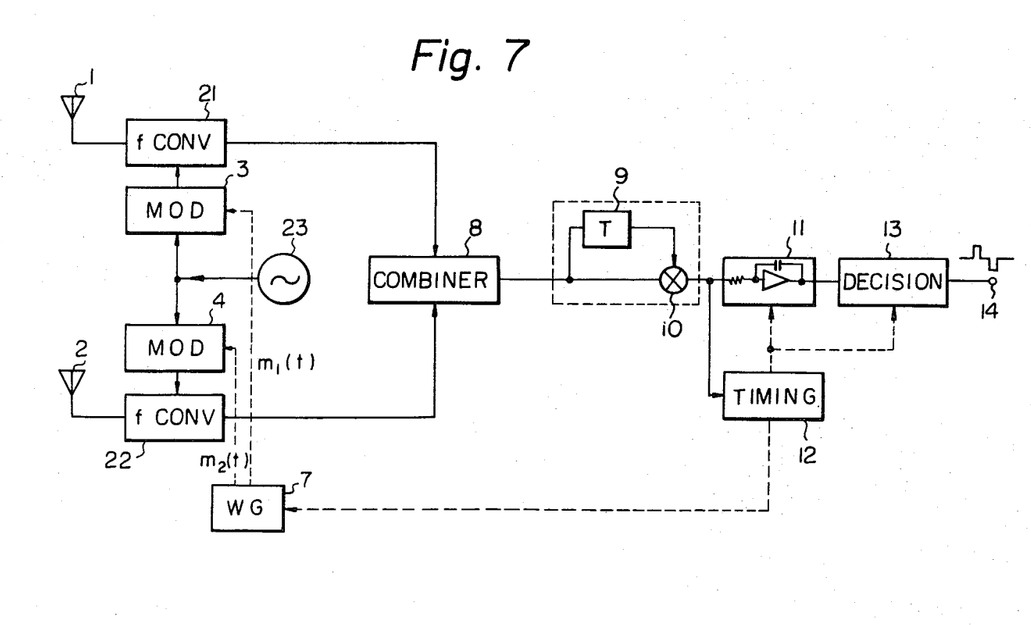
FIG. 7 is the block diagram of another embodiment of the diversity receiver according to the present invention.

FIG. 7 shows the block diagram of another diversity system according to the present invention, in which the reference numerals 1,2,3,4,7,8,9,10,11,12,13 and 14 show the same numbers as those in FIG. 2, and the reference numerals 21 and 22 are frequency converters, and 23 is the local oscillator. The apparatus in FIG. 7 converts radio frequency into intermediate frequency using the frequency converters 21 and 22. In FIG. 7, the local signal from the oscillator 23 is modulated by the modulators 3 and 4 (amplitude modulation or phase modulation), and the modulated local signal is utilized for converting the radio frequency to the intermediate frequency. The operation of FIG. 7 is substantially the same as that of FIG. 2.

FIG. 8 shows the block diagram of another embodiment of the present diversity system, in which the reference numerals 1,9,10,11,13,14 are the same as those in FIG. 2. 25 is a reception amplifier, 26 and 27 are transmission antennas, 28 is the terminal for receiving the signal to be transmitted. 3a and 4a are modulators (amplitude modulators or phase modulators), to which the local signal $m_1(t)$ and $m_2(t)$ or $\psi_1(t)$ and $\psi_2(t)$ are applied. The substantial operation of FIG. 8 is of course the same as that of FIG. 2.

From the foregoing it will now be apparent that a new and improved diversity system has been found.

What is claimed is:

1. A diversity system for an angle modulated digital signal transmission utilizing a plurality of branches comprising:

generator means for generating local signals, modulation means, for each of said branches, for modulating a respective received periodic digital signal with said local signals; each said local signal having the same period as said received digital signal, and satisfying an orthogonal condition for all branches, each of said modulating means providing a modulated signal for a respective one of said branches, combining means for combining all said modulated signals, a differential detector, the input of which is connected to the output of said combining means, and an integrate-and-dump filter connected to the output of said differential detector.

2. A diversity system according to claim 1, wherein said modulation means performs the amplitude modulation of said received digital signal with one of the local signals.

3. A diversity system according to claim 1, wherein said modulation means performs the angle modulation of said received digital signal with one of the local signals.

4. A diversity system according to claim 1, wherein said angle modulated digital signal is a digitally frequency modulated signal.

5. A diversity system according to claim 1, wherein said angle modulated digital signal is a digitally phase modulated signal.

6. A diversity system according to claim 2, wherein said local signals in all branches satisfy;

$$m_i(t) = m_i(t - T)$$

$$\int_{nT}^{(n+1)T} m_i(t)m_j(t)dt = 0$$

where
 $i = j$,
 $i,j = 1,2,3, \ldots, m$,
 n is an integer,
 T is the period of said received digital signal, and
 m is the number of branches.

7. A diversity system according to claim 6, wherein $m=2$, and said local signals are $$m_1 = \sqrt{2/T} \sin \frac{2\pi}{T} t$$

$$m_2 = \sqrt{2/T} \cos \frac{2\pi}{T} t$$

8. A diversity system according to claim 3, wherein said local signals satisfy;

$$\psi_i(t) = \psi_i(t - T)$$

$$\int_{nT}^{(n+1)T} \exp[-j\{\psi_i(t) - \psi_j(t)\}]dt = 0$$

where $i = j$, $i,j = 1,2,3 \ldots m$, n is an integer, T is the period of said received digital signal, and m is the number of branches.

9. A diversity system for an angle modulated digital signal transmission utilizing a plurality of branches comprising a common local oscillator for generating local signals for all of said branches, a plurality of modulation means, each modulation means being included in one of said branches, for modulating a received periodic digital signal with one of said local signals, each said local signal having the same period as said received digital signal, and satisfying an orthogonal condition for all branches, a plurality of frequency mixers for mixing said received digital signal with the output of said modulation means of the respective branch, combining means for combining all the outputs of said frequency mixers, a differential detector, the input of which is connected to the output of said combining means, and an integrate-and-dump filter connected to the output of said differential detector.

10. A diversity system according to claim 9, wherein said modulation means performs amplitude modulation.

11. A diversity system according to claim 9, wherein said modulation means performs angle modulation.

12. A diversity system for an angle modulated digital signal transmission utilizing a plurality of branches comprising;

a generator means for generating local signals, a plurality of modulation means provided for all branches for modulating an angle modulated periodic digital signal to be transmitted with said local signals, each said local signal having the same period as the digital signal, and satisfying an orthogonal condition for all branches, a plurality of transmitting means for transmitting each output of said modulating means provided at a transmission side, receiving means for receiving all of the branch signals provided at a reception side, a differential detector for detecting the output of said receiving means, and an integrate-and-dump filter connected to the output of said differential detector.

* * * * *